(12) United States Patent
Hölzenbein

(10) Patent No.: US 12,439,481 B2
(45) Date of Patent: Oct. 7, 2025

(54) METHOD FOR PRODUCING A PAVING SLAB

(71) Applicant: CT-COATING AG, Königswinter (DE)

(72) Inventor: Ernst Hölzenbein, Cochem (DE)

(73) Assignee: CT-COATING AG, Königswinter (DE)

( * ) Notice: Subject to any disclaimer, the term of this patent is extended or adjusted under 35 U.S.C. 154(b) by 264 days.

(21) Appl. No.: 18/023,170

(22) PCT Filed: Aug. 24, 2021

(86) PCT No.: PCT/EP2021/073398
§ 371 (c)(1),
(2) Date: Feb. 24, 2023

(87) PCT Pub. No.: WO2022/043328
PCT Pub. Date: Mar. 3, 2022

(65) Prior Publication Data
US 2023/0300953 A1 Sep. 21, 2023

(30) Foreign Application Priority Data
Aug. 25, 2020 (EP) ..................................... 20192583

(51) Int. Cl.
*H05B 3/34* (2006.01)
*E01C 5/22* (2006.01)
(Continued)

(52) U.S. Cl.
CPC .................. *H05B 3/34* (2013.01); *E01C 5/22* (2013.01); *E01C 11/265* (2013.01); *E01C 17/00* (2013.01);
(Continued)

(58) Field of Classification Search
CPC ................ H05B 3/34; H05B 2203/013; H05B 2203/017; H05B 2214/02;
(Continued)

(56) References Cited

U.S. PATENT DOCUMENTS

| | | | |
|---|---|---|---|
| 8,907,202 B1 | 12/2014 | Brusaw et al. | |
| 2013/0206206 A1* | 8/2013 | Bjorneklett | F24S 25/33 136/246 |

(Continued)

FOREIGN PATENT DOCUMENTS

| | | | |
|---|---|---|---|
| CN | 105546627 A | 5/2016 | |
| CN | 107288010 A | 10/2017 | |

(Continued)

OTHER PUBLICATIONS

International Search Report for PCT/EP2021/073398 mailed on Nov. 15, 2021.

*Primary Examiner* — S. Behrooz Ghorishi
(74) *Attorney, Agent, or Firm* — Schmeiser, Olsen & Watts, LLP

(57) ABSTRACT

A paving slab is provided, including a slab body having a recess, a module which is arranged in the recess, wherein the module extends in a planar manner along a module plane, and a flat cover element, which is oriented along the module plane and is translucent at least in sections, for protecting the at least one module. The module is enclosed in a liquid-tight manner by the slab body and the cover element. The module includes a photovoltaic layer, a luminous layer and a support element to which the photovoltaic layer and the luminous layer are applied by screen printing, wherein the photovoltaic layer, the luminous layer and the entire module are flexible. Also provided is a paving system including the paving slab and to a method for producing the paving slab.

12 Claims, 4 Drawing Sheets

(51) Int. Cl.
*E01C 11/26* (2006.01)
*E01C 17/00* (2006.01)
*H02S 20/26* (2014.01)

(52) U.S. Cl.
CPC ........ *H02S 20/26* (2014.12); *H05B 2203/013* (2013.01); *H05B 2203/017* (2013.01); *H05B 2214/02* (2013.01)

(58) Field of Classification Search
CPC ... H05B 2203/026; H05B 3/0038; E01C 5/22; E01C 11/265; E01C 17/00; H02S 20/26; H02S 40/30; Y02B 10/10; Y02E 10/50
See application file for complete search history.

(56) References Cited

U.S. PATENT DOCUMENTS

| | | | | |
|---|---|---|---|---|
| 2019/0051782 | A1* | 2/2019 | Huang | H01L 31/02008 |
| 2020/0336003 | A1* | 10/2020 | Narla | H02J 7/007 |
| 2023/0263230 | A1* | 8/2023 | Riva Reggiori | H01M 10/63 |
| | | | | 219/635 |

FOREIGN PATENT DOCUMENTS

| | | | | |
|---|---|---|---|---|
| CN | 108894072 | A | 11/2018 | |
| CN | 107938462 | B | 5/2020 | |
| DE | 203 19 024 | U1 | 3/2004 | |
| EP | 2854486 | A1 * | 4/2015 | ............ G09F 13/22 |
| FR | 3016257 | A1 | 7/2015 | |
| FR | 3016258 | A1 * | 7/2015 | ............ E01C 7/00 |
| IN | 205917555 | U | 2/2017 | |
| JP | 2002021036 | A * | 1/2002 | |
| WO | 93/23968 | A1 | 11/1993 | |

* cited by examiner

METHOD FOR PRODUCING A PAVING SLAB

CROSS-REFERENCE TO RELATED APPLICATIONS

This application claims priority to PCT Application No. PCT/EP2021/073398, having a filing date of Aug. 24, 2021, based on EP Application No. 20192583.1, having a filing date of Aug. 25, 2020, the entire contents both of which are hereby incorporated by reference.

FIELD OF TECHNOLOGY

The following relates to a method for producing a paving slab for paving a traffic surface, the paving slab comprising a slab body with at least one recess, a module arranged in the at least one recess, the module extending in a planar manner along a module plane, and at least one planar cover element aligned along the module plane and translucent at least in sections for protecting the at least one module.

BACKGROUND

From the conventional art, for example from the publications FR 3 016 257 A1, JP 2002-21036 A, CN 107288010 A, CN 105546627 A, CN 108894072 A, CN 205917555 U, U.S. Pat. No. 8,907,202 B1 or CN 107938462 B, components for traffic routes with additional functions, for example for lighting the traffic route, for heating the traffic route, for energy generation, for energy storage or for inductive charging of electric vehicles, are known. The main disadvantages of the known components are their high manufacturing costs due to a complex structure and their short service life when used in a traffic route, for example due to damage caused by mechanical loads, in particular by vibrations, by temperature fluctuations or by penetrating water, in particular by penetrating salt water.

The task of embodiments of the invention are to provide a cost-effective and reliable manufacturing process for components for traffic routes with additional functions, which have an extended service life.

SUMMARY

An aspect relates to a method for producing a paving slab for paving a traffic surface, wherein the paving slab comprises a slab body with at least one recess, wherein a module is arranged in the at least one recess, wherein the module extends in a planar manner along a module plane. That is, a length and a width of the module orthogonal to the length along the module plane are each substantially greater than a height of the module perpendicular to the module plane. For example, the length and/or the width are at least ten times as large, in particular at least one hundred times as large, as the height.

For example, the module can be essentially cuboid shaped.

The module comprises at least one flat heating layer aligned along the module plane for heating an environment of the module.

For example, the heating layer has a thickness perpendicular to the module plane of 6 µm to 60 µm. The heating layer contains, for example, carbon nanotubes, organic solutions, emulsifiers, thickeners, diluents, conditioners, viscosity agents, adhesives and/or antioxidants. The materials used as the heating layer convert almost 100% of the electrical energy fed in via the heating voltage into heat.

The heating layer is designed for heating up to a maximum temperature of 523 K.

The heating layer comprises, for example, a number of conductor tracks that are embedded perpendicular to the module plane between two electrical insulation layers. The heating layer can be constructed, for example, like the surface heating element described in DE 203 19 024 U1 or the resistor heating unit 19 described in WO 93/23968 A1. The corresponding paragraphs [0016] to [0026] of DE 203 19 024 U1 and FIGS. 7a and 7b with their description on page 12 of WO 93/23968 A1 are incorporated herein by reference.

The module comprises at least one flat energy storage layer aligned along the module plane for storing electrical energy, wherein a flat thermal insulation layer aligned along the module plane is arranged between the heating layer and the energy storage layer.

Due to the energy storage layer, the module can be operated independently of an external energy supply. Furthermore, the energy storage layer can be charged when a particularly large amount of low-cost electrical energy is available, for example from wind turbines or photovoltaic systems, and the stored energy can be consumed later when less electrical energy is available.

This minimises the operating costs of the module and compensates for fluctuations in the energy supply without the need for an additional, expensive, and space-consuming energy storage system.

The integration of an energy storage layer into the module is made more difficult by the fact that most common energy storage devices may not be exposed to high temperatures of, for example, over 60° C., especially over 85° C., in particular because of the liquids they contain.

The thermal insulation layer protects the energy storage layer from being overheated by the heating layer, especially when the heating layer is operated at a high temperature to heat a large room with a compact module.

The module comprises at least one flat photovoltaic layer aligned along the module plane for generating electrical energy. With the help of the photovoltaic layer, the heating layer can be supplied with energy without an external energy supply. Of course, even if a photovoltaic layer is present, the module can still comprise a connection for an external energy supply to supply the heating layer and/or to deliver energy obtained from the photovoltaic layer to the external energy supply.

In an embodiment, the module comprises at least one energy storage layer and at least one photovoltaic layer. As a result, the energy generated by the photovoltaic layer can be temporarily stored in the energy storage layer and used to operate the heating layer later, in particular while the photovoltaic layer is not supplying sufficient power to operate the heating layer.

The module comprises at least one flat, flexible, luminous layer aligned along the module plane for illuminating an environment of the module, wherein the luminous layer comprises a plurality of material layers aligned along the module plane with different material compositions from one another.

By integrating the luminous layer into the module, a surrounding area of the module can be illuminated without separate luminaires, so that, for example, heating and lighting of the surrounding area can be ensured with particularly low investment and space requirements.

The at least one luminous layer and the at least one photovoltaic layer, in particular all the layers, each comprise a plurality of material layers aligned along the module plane with different material compositions from one another.

By constructing the layers from layers of material aligned along the module plane, the layers can be produced particularly easily, quickly and inexpensively, for example using a printing process, in particular a screen printing process.

In an embodiment, the material layers each extend over an entire surface of the module along the module plane. This allows the material layers to be produced in a particularly simple manner.

The photovoltaic layer is designed as a low-light-condition solar module and/or as a thin-film solar module, comprising for example amorphous silicon (a-Si:H), microcrystalline silicon (μc-Si:H), gallium arsenide (GaAs), cadmium telluride (CdTe) or copper-indium-(gallium)-sulphur-selenium compounds as photoactive material.

In a further embodiment, the photovoltaic layer comprises, perpendicular to the module plane, at least one translucent front electrode layer and/or thereafter indirectly or directly at least one carrier structure layer for mechanical stabilisation and/or thereafter indirectly or directly at least one photoactive layer with a photoactive material and/or thereafter indirectly or directly at least one transport layer and/or thereafter indirectly or directly at least one back electrode layer and/or thereafter indirectly or directly at least one encapsulation layer, wherein a voltage can be applied between transparent front electrode layer and back electrode layer.

It is conceivable that the transport layer and the carrier structure layer are dispensed with. This is advantageous because it allows for a particularly thin design. However, it is disadvantageous because the transport layer has particularly good properties for maintaining the charge separation. In addition, it is conceivable that the photoactive material loses its effect without a stabilising carrier structure layer. For the carrier structure layer, for example, glass, PMMA, metal foils, plastic foils are conceivable. For the transport layer, negative and positive formations of organic and/or inorganic materials are conceivable. They have the task of transporting the electrons better.

The encapsulation layer is formed as an electrical insulation layer, for example made of a plastic. If the photovoltaic layer is adjacent to another layer which has an encapsulation layer on a side facing the photovoltaic layer, the photovoltaic layer can be designed without an encapsulation layer on the side facing the other layer. This enables a particularly material-saving and fast production.

The encapsulation layer adjacent to the back electrode has a thickness between 500 nm and 250 μm. The back electrode layer has a thickness between 100 nm and 15 μm. The transport layer has a thickness between 50 nm and 5 μm. The photoactive layer has a thickness between 50 nm and 5 μm. The carrier structure layer has a thickness between 100 nm and 5 μm. The front electrode layer has a thickness between 100 nm and 5 μn. The encapsulation layer adjacent to the front electrode has a thickness between 20 μm and 250 μm.

The energy storage layer is resistant to a temperature of at least 60° C., in particular at least 85° C., at least 120° C. Due to this increased heat resistance compared to conventional energy storage devices, for example lithium-ion accumulators, the energy storage layer can be combined with the heating layer in a compact module without the energy storage layer being damaged by heat emitted by the heating layer.

The energy storage layer can be free of liquids, contain sodium ions and in particular no lithium ions as mobile charge carriers and/or be free of pinholes. Each of these features, and in particular a combination of several of these features, increases the thermal resistance of the energy storage layer.

The energy storage layer comprises at least two electrode layers, between them at least one separator layer with an electrolyte and at least one encapsulation layer on each of the outer sides. The encapsulation layer is designed as an electrical insulation layer, for example made of a plastic.

If the energy storage layer is adjacent to another layer which has an encapsulation layer on a side facing the energy storage layer, the energy storage layer can be designed without an encapsulation layer on the side facing the other layer. This enables a particularly material-saving and fast production.

At least one electrode layer comprises a metal, in particular lithium or sodium, carbon, in particular in the form of activated carbon, activated carbon fibre, carbide-derived carbon, carbon aerogel, graphite, graphene and/or carbon nanotubes, a transition metal oxide, for example an oxide of ruthenium, iridium, iron and/or manganese, and/or an electrically conductive polymer, for example polypyrrole, polyaniline, pentacene or polythiophene.

The separator layer comprises, for example, a porous plastic and/or a porous ceramic. The electrolyte comprises, for example, an aqueous electrolyte solution, an organic electrolyte solution, an ionic liquid, a superconcentrated electrolyte, an ion-conductive polymer and/or an ion-conductive ceramic, e.g. $Ag_4RbI_5$ for the charge transport of $Ag^+$ ions, a closo-borane for the charge transport of Na ions or a $LiI/Al_2O_3$ mixture for the charge transport of $Li^+$ ions.

The energy storage layer is designed as a solid-state accumulator, for example a lithium-air solid-state accumulator, or as a supercapacitor.

A thickness perpendicular to the module plane is 20 μm to 250 μm for the encapsulation layers, 3 μm to 250 μm for the electrode layers and/or 0.5 μm to 250 μm for the separator layer.

The at least one luminous layer, the at least one heating layer, the at least one energy storage layer and/or the at least one photovoltaic layer are arranged one above the other perpendicular to the module plane. This makes it particularly easy to apply the layers one after the other to a substrate, for example using a printing process, in particular a screen printing process.

A layer thickness of the at least one luminous layer, the at least one heating layer, the at least one energy storage layer and/or the at least one photovoltaic layer perpendicular to the module plane is from 0.1 μm to 1 mm, from 0.5 μm to 0.2 mm.

The at least one luminous layer, the at least one photovoltaic layer and the entire module are designed to be flexible. This reduces the risk of damage due to mechanical stress. In this way, the module according to embodiments of the invention differ from known photovoltaic modules or luminous modules that are rigid, so that they can easily be damaged by mechanical loads, in particular by vibrations, when used in a traffic route.

The insulating layer comprises a calcium silicate, chitosan, and a heat-resistant binder. With the mentioned ingredients, a particularly thin and flexible insulating layer with a low thermal conductivity can be produced in a simple way, for example by screen printing.

The insulating layer may include PET, PVC, organic solutions, emulsifiers, thickeners, diluents, conditioners, viscosity agents, adhesives and/or anti-oxidants.

The insulating layer has a thickness of 10 μm to 500 μm, 40 μm to 100 μm.

In an embodiment, the photovoltaic layer is designed as a layer that is translucent, in particular transparent, at least in some areas, in particular in such a way that the at least one luminous layer and the photovoltaic layer are arranged one above the other perpendicular to the module plane. If the photovoltaic layer is translucent, it can be used as a translucent layer for the light of the luminous layer when the incident light decreases, for example at dusk.

It is conceivable that a through-contact between the photovoltaic layer and an energy storage layer through the luminous layer enables the transfer of the electrical energy generated in the photovoltaic layer into the energy storage layer. A further contacting enables the release of the energy stored in the energy storage layer for the supply of the luminous layer.

In another embodiment, the at least one photovoltaic layer is opaque. This is particularly advantageous because photovoltaic layers that are not transparent have a greater efficiency than transparent photovoltaic layers.

The photovoltaic layer and the luminous layer can be arranged next to or inside each other along the module plane so that they do not interfere with each other when receiving or emitting light perpendicular to the module plane. The disadvantage of this is that the entire surface of the module is not available for the photovoltaic layer and the light-emitting layer. It is advantageous that an energy storage layer can be arranged both adjacent to the photovoltaic layer and adjacent to the light-emitting layer, which enables particularly efficient energy transport.

In an embodiment, an induction layer of the module and/or the at least one energy storage layer is translucent, in particular transparent, at least in some areas. These designs allow light from the luminous layer or photovoltaic layer to be absorbed or emitted through the energy storage layer and/or induction layer, so that the layer sequence can be optimised, for example, for the simplest possible production or an efficient connection of the individual layers.

The module comprises at least one flexible support element extending flatly along the module plane, to which the at least one luminous layer and the at least one photovoltaic layer are applied using a screen printing process.

The layers can be applied to one or both sides on the surface of the support element. A one-sided application allows a particularly fast production. A double-sided application ensures a particularly high mechanical stability due to the arrangement of the support element between the layers. For example, the heating layer can be applied to one side and an energy storage layer can be applied to the opposite side of the support element, whereby the support element contributes to the thermal insulation of the energy storage layer from the heating layer.

The support element comprises, for example, a plastic, in particular PET, a polyimide, PMMA and/or a polycarbonate, and/or a metal. The support element is rectangular. The support element is film-like and flexible. In this way, the entire module can be made thin and flexible. The support element comprises, for example, a plastic film and/or metal foil with a thickness of from 1 μm to 1 mm, in particular from 5 μm to 50 μm. The support element comprises in particular a PET film with a thickness of 5 μm to 50 μm.

The support element provides the module with sufficient mechanical stability so that the module is not damaged during its manufacture, further processing, or use.

The module comprises at least one, flexible, encapsulation layer for protecting at least the at least one luminous layer, the at least one heating layer, the at least one energy storage layer and/or the at least one photovoltaic layer from environmental influences, in particular from moisture and/or mechanical loads.

The encapsulation layer comprises for example a plastic, in particular PET, a polyimide, PMMA and/or a polycarbonate. The encapsulation layer is applied to the support element by screen printing.

The support element and/or the encapsulation layer is translucent, in particular transparent, at least in sections. This is particularly advantageous to be translucent to the light received by the at least one photovoltaic layer or to the light emitted by a luminous layer.

The module comprises at least one planar, flexible, induction layer aligned along the module plane for inductively charging an electronic device arranged on the module, an electric vehicle, wherein the at least one induction layer comprises a plurality of material layers aligned along the module plane with material compositions differing from one another.

With the induction layer, the electronic device can be charged wirelessly, so that the module provides another functionality without taking up significantly more space or requiring additional installation work. In particular, when the module is placed in the floor of a car park, the previously very impractical charging of electric vehicles can be significantly simplified with the help of the module's induction layer.

For municipalities and private owners, clearing paved traffic surfaces, such as pavements, cycle paths, roads, car parks and other places, of snow and ice in winter requires considerable human and material resources. In addition, the de-icing agents often used for this purpose, especially road salt, lead to increased corrosion of vehicles and burns of animals and plants. By selectively heating the traffic surfaces with the heating layer of the module of a paving slab according to embodiments of the invention, these can be kept free of snow and ice without personnel and material expenditure and without the use of de-icing agents.

If the module includes a photovoltaic layer, this results in the additional advantage that the additional costs of a paving slab with module compared to a conventional paving slab can be compensated or even overcompensated by selling or own use of the generated electrical energy. In addition, the ecological disadvantages of paved traffic surfaces, in particular due to the soil sealing they cause, can be at least partially offset by the generation of renewable energy.

The slab body can have any shape and/or size known for customary paving slabs, in particular the slab body can be essentially cuboid shaped.

The slab body can comprise any material known for standard paving slabs. In particular, the body of the slab may comprise an artificial stone and/or a plastic, preferably a recycled composite material.

The use of a recycled raw material in the form of a recycled composite material significantly improves the environmental performance relative to common materials made from primary raw materials. Recycled composites also include plastics obtained from recyclable household waste, especially packaging waste. Recycled composite materials from packaging waste have already been used, for example, for flood protection walls (DE 20 2004 008 412 U1, DE 20

2004 012 013 U1), roadway elements (DE 9 406 259 U1) or noise barriers (DE 10 2007 053 614 A1).

The paving slab comprises at least one flat cover element, which is aligned along the module plane of the at least one module and is translucent, in particular transparent, at least in sections, for protecting the at least one module, the at least one module being enclosed by the slab body and the at least one cover element in at least a liquid-tight manner.

The cover element protects the module from mechanical loads and from foreign substances, especially rainwater and substances suspended or dissolved in it, such as salt. The cover element thus increases the service life of the module.

The cover element consists of a plastic that is cast onto the module in the recess. By casting the module with plastic, it can be enclosed in a particularly reliable and permanently liquid-tight manner. The cover element can comprise, for example, a glass plate arranged on the module in the recess, which is connected to the slab body in a liquid-tight manner with a sealing means, in particular with a sealing ring. The glass plate is more resistant to light-induced ageing and mechanical abrasion than a cover element made of plastic and thus permanently ensures a high level of light transmission, which enables efficient operation of the photovoltaic layer and the light-emitting layer of the module.

The paving panel comprises at least one sensor for automatically controlling the at least one heating layer and/or the at least one luminous layer of the module, wherein the at least one sensor comprises a temperature sensor, a brightness sensor and/or a presence sensor, a radar sensor and/or infrared sensor.

With the help of a temperature sensor, the heating layer can be controlled automatically in such a way that icing of the paving slab is prevented with minimal energy consumption.

With the help of a brightness sensor, the luminous layer can be activated automatically exactly when a low ambient brightness requires it, so that energy consumption is minimised.

With the help of a presence sensor, the luminous layer can be activated automatically exactly when the paving slab is walked on or driven over, so that energy consumption is minimised. A radar sensor and an infrared sensor have the advantage over other presence sensors, for example pressure sensors, that they contain no moving parts and are therefore particularly durable. In particular, a liquid-tight enclosure of the module is not compromised by a movement of moving parts.

A paving system for paving a traffic surface may comprise a plurality of paving slabs produced by a method according to embodiments of the invention and at least one bus cable for central power supply and/or control of at least the heating layers and/or luminous layers of the paving slabs, wherein each of the paving slabs comprises at least one bus connector for connecting the heating layers and/or luminous layers of the paving slabs to the at least one bus cable.

The paving slabs and the bus cable are designed for power supply and/or control with a low-voltage system, in particular with a voltage of 60 V maximum. A low-voltage system has the advantage that it can be safely installed by persons without special knowledge in the field of electrical installation, for example by pavers.

The control can be carried out by a central control unit, in particular with a number of central sensors and/or automatically. This results in the advantage that not every single paving slab has to be equipped with sensors and/or a control unit, which reduces installation costs.

The central sensors can, for example, be designed as described above for the sensors of the paving slab according to embodiments of the invention.

The bus connector is designed to be protected against polarity reversal to simplify installation.

The bus connector is lockable to prevent unintentional detachment from the paving slab, for example due to vibrations when the paving slab is driven over. To protect against corrosion and short circuits, the bus connector is waterproof.

Embodiments of the invention relate to a method for producing a previously described paving slab. In embodiments, the method comprises at least the following steps, in particular in the order mentioned:

a. providing a flat support element for the module of the paving slab,
b. screen printing of the at least one photovoltaic layer and, the at least one luminous layer of the module onto the support element,
c. placing the module in the recess of the slab body of the paving slab and
d. liquid-tight enclosing of the module in the recess with the cover element of the paving slab.

The support element can in particular be designed as described above.

In particular, the layers can be designed as described above. In an embodiment, all layers of the module are produced by screen printing. In particular, electrical connections necessary for the operation of the module between the layers and/or within the layers of the module can also be produced by screen printing. In an embodiment, the entire module or the entire module except for the support element is produced by screen printing.

The materials for creating the layers can be provided as pastes, which are applied using a screen printing process. A particular advantage of the screen printing process is that the layers can be applied very quickly and cost-effectively. Speeds of up to 400 m$^2$ per hour are possible with an appropriate printing machine.

Enclosing the module involves casting the cover element made of a plastic onto the module in the recess. By casting the cover element, a reliable and long-lasting seal of the module against environmental influences is achieved particularly easily and quickly.

The cover element is cast under high-frequency excitation of the plastic. Excitation of the plastic with high-frequency vibrations, for example with a frequency of 1 MHz to 1 THz, in particular 10 MHz to 1 GHz, expels possible gas inclusions, which could lead to leaks or a reduced mechanical load-bearing capacity of the cover element, from the liquid plastic.

In embodiments, the method comprises curing at least one layer of the module by irradiating the layer with infrared light, during an irradiation period of 0.1 s to 100 s, particularly of 1 s to 10 s. The curing allows further layers to be applied directly to the cured layer without additional waiting time, without damaging the cured layer. The module can thus be produced particularly quickly and cost-effectively.

Irradiation with infrared light has the advantage that the coatings can be heated and thus cured without contact and particularly quickly.

BRIEF DESCRIPTION

Some of the embodiments will be described in detail, with references to the following Figures, wherein like designations denote like members, wherein.

DETAILED DESCRIPTION

Figure 1:
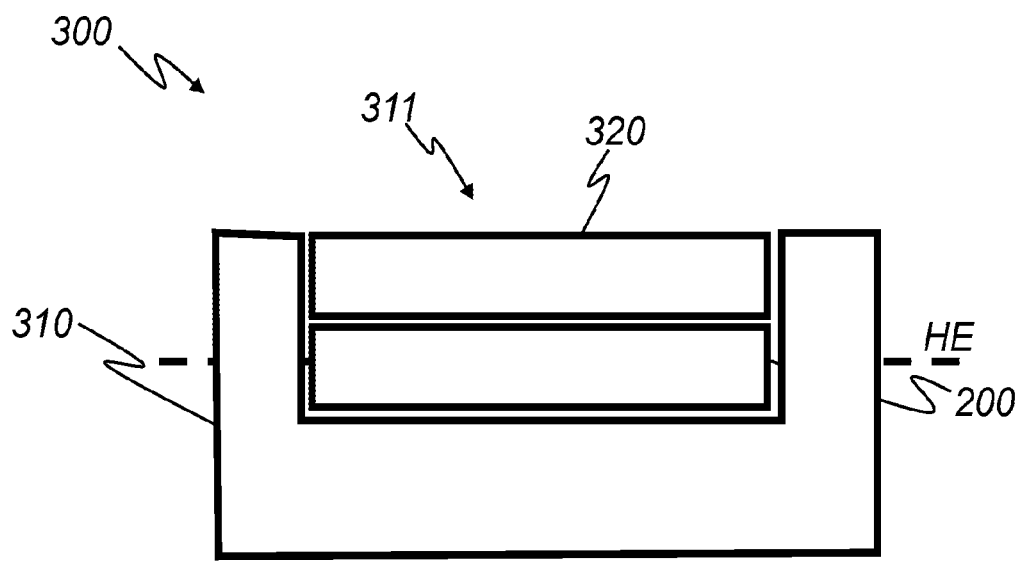
FIG. 1 shows a schematic sectional view perpendicular to the module plane of a paving slab produced according to embodiments of the invention.

FIG. 1 shows a schematic sectional view perpendicular to the module plane HE of a paving slab 300 produced according to embodiments of the invention. The paving slab 300 comprises a slab body 310 with a recess 311, wherein a module 200 according to embodiments of the invention is arranged in the recess 311.

The paving slab 300 comprises a planar cover element 320, aligned along the module plane HE of the module 200 and translucent at least in sections, for protecting the module 200, wherein the module 200 is enclosed by the slab body 310 and the at least one cover element 320 in a fluid-tight manner.

The cover element 320 comprises, for example, a transparent plastic material cast to the slab body 310.

Figure 2:
FIG. 2 shows a schematic sectional view perpendicular to the module plane of a module of a paving slab produced according to embodiments of the invention.

FIG. 2 shows a schematic sectional view perpendicular to the module plane HE of a module 200 of a paving slab 300 produced according to embodiments of the invention. The module 200 extends flatly along the module plane HE and comprises a flat heating layer 290 aligned along the module plane HE for heating an environment of the module 200 and a flat photovoltaic layer 280 aligned along the module plane HE for generating electrical energy.

Figure 7:
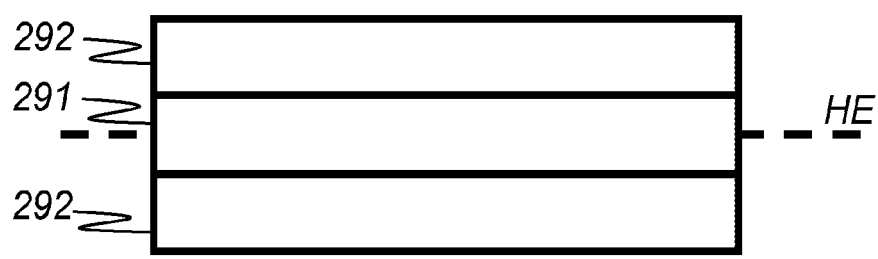
FIG. 7 shows a schematic sectional view perpendicular to the module plane of a heating layer of a module of a paving slab produced according to embodiments of the invention.
Figure 9:
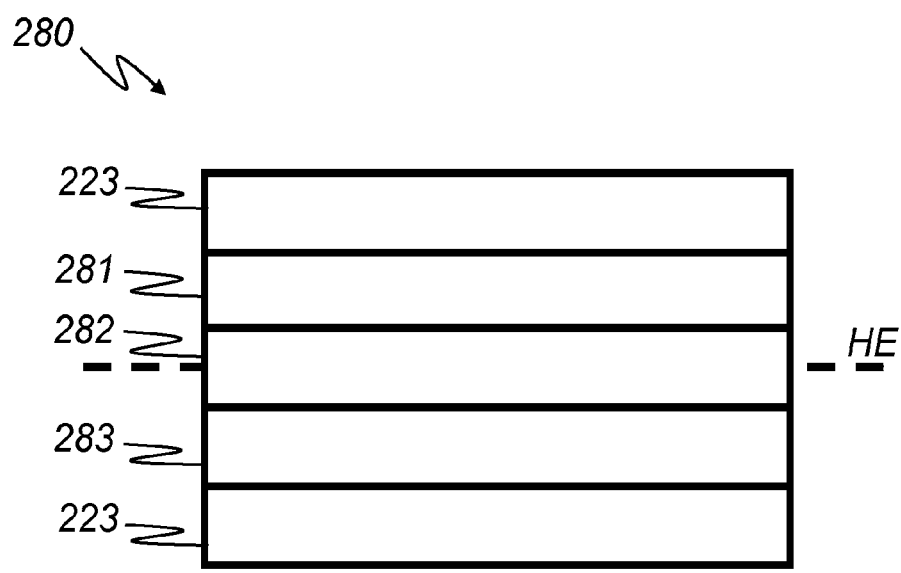
FIG. 9 shows a schematic sectional view perpendicular to the module plane of a photovoltaic layer of a module of a paving slab produced according to embodiments of the invention.

The heating layer 290 and the photovoltaic layer 280 each comprise a plurality of material layers aligned along the module plane HE (shown by hatching) with different material compositions from each other. A possible structure of the heating layer 290 and the photovoltaic layer 280 is shown in FIGS. 7 and 9.

Electrical connections between the layers and/or within the layers of the module 200 that are necessary for the operation of the module 200 are not shown here and in the following figures for the sake of clarity.

Figure 3:
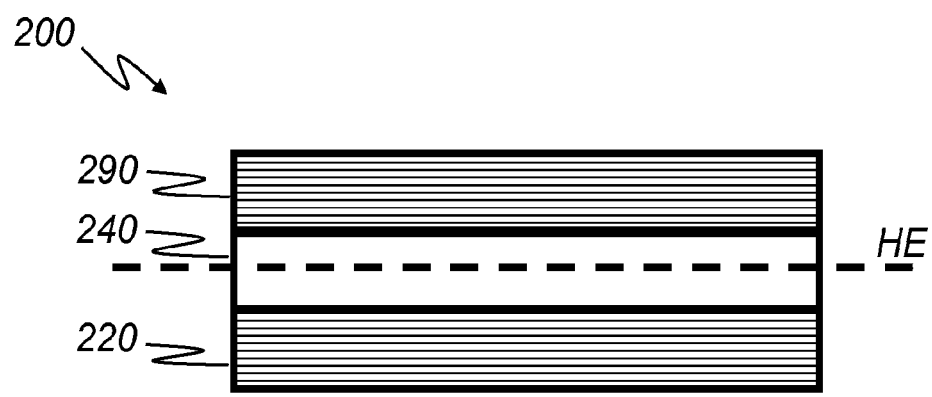
FIG. 3 shows a schematic sectional view perpendicular to the module plane of a further module of a paving slab produced according to embodiments of the invention.

FIG. 3 shows a schematic sectional view perpendicular to the module plane HE of a module 200 of a paving slab 300 produced according to embodiments of the invention. The module 200 extends in a planar manner along the module plane HE and comprises a planar heating layer 290 aligned along the module plane HE for heating an environment of the module 200 and a planar energy storage layer 220 aligned along the module plane HE for storing electrical energy, wherein a planar thermal insulation layer 240 aligned along the module plane HE is arranged between the heating layer 290 and the energy storage layer 220.

The insulating layer 240 comprises, for example, a calcium silicate, chitosan and a heat-resistant binder and has, for example, a layer thickness perpendicular to the module plane HE of 40 μm to 100 μm.

Figure 8:
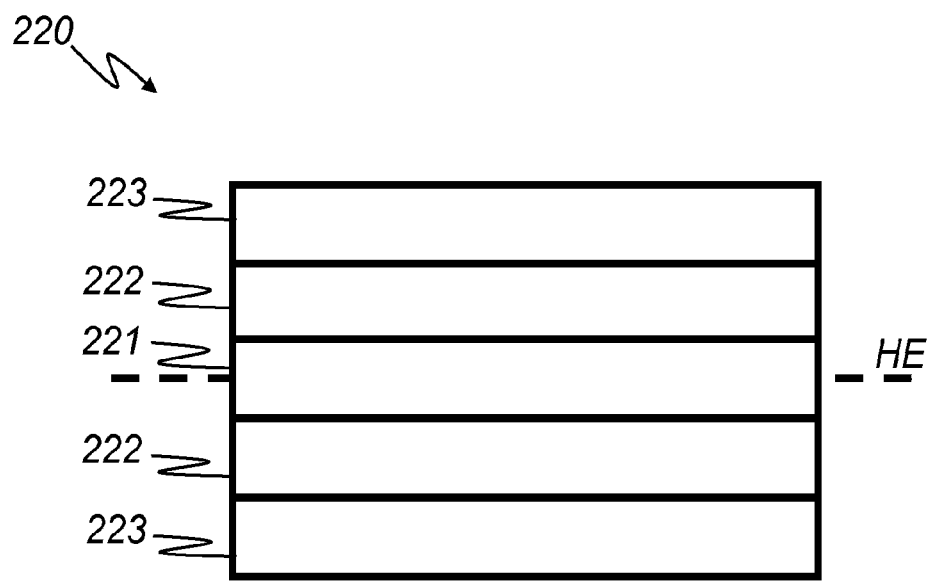
FIG. 8 shows a schematic sectional view perpendicular to the module plane of an energy storage layer of a module of a paving slab produced according to embodiments of the invention.

The heating layer 290 and the energy storage layer 220 each comprise a plurality of material layers aligned along the module plane HE (shown by hatching) with different material compositions from each other. One possible structure of each of the heating layer 290 and the energy storage layer 220 is shown in FIGS. 7 and 8.

Figure 4:
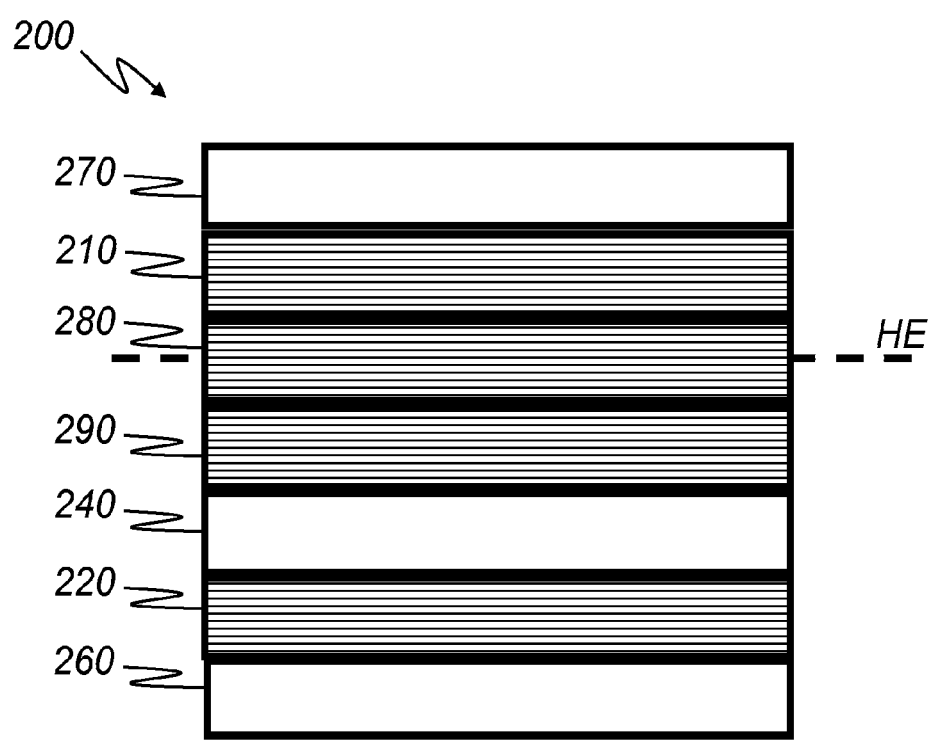
FIG. 4 shows a schematic sectional view perpendicular to the module plane of a further module of a paving slab produced according to embodiments of the invention.

FIG. 4 shows a schematic sectional view perpendicular to the module plane HE of a further module 200 of a paving slab 300 produced according to embodiments of the invention.

In addition to the layers shown in FIG. 2, the module 200 comprises the following further layers:

The module 200 comprises a planar luminescent layer 210 aligned along the module plane HE for illuminating an environment of the module 200, wherein the luminescent layer 210 comprises a plurality of material layers (shown by hatching) aligned along the module plane HE having different material compositions from each other.

Figure 5:
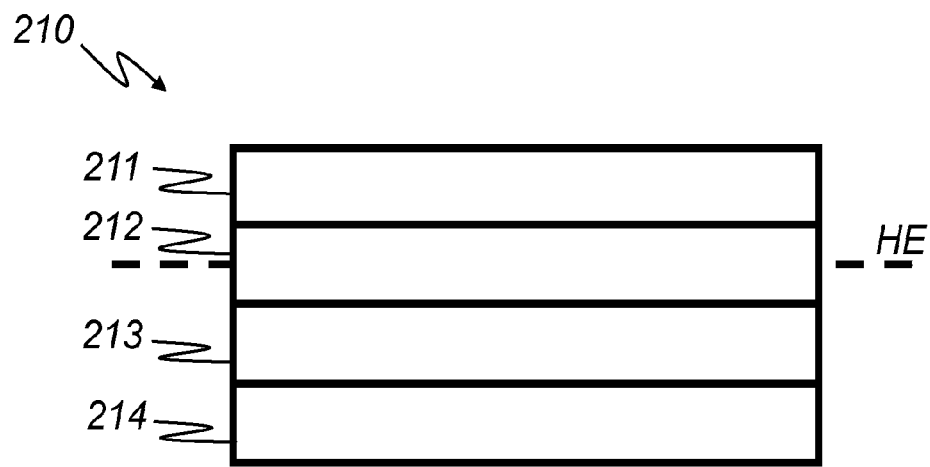
FIG. 5 shows a schematic sectional view perpendicular to the module plane of a luminous layer of a module of a paving slab produced according to embodiments of the invention.

The luminescent layer 210 is arranged, for example, on the side of the photovoltaic layer 280 facing away from the heating layer 290. A possible structure of the luminescent layer 210 is shown in FIG. 5.

The module 200 comprises a planar energy storage layer 220 aligned along the module plane HE for storing electrical energy, wherein a planar thermal insulation layer 240 aligned along the module plane HE is arranged between the heating layer 290 and the energy storage layer 220.

The energy storage layer 220 is arranged, for example, on the side of the heating layer 290 facing away from the photovoltaic layer 280.

The insulating layer 240 is designed, for example, as described for FIG. 3.

The heating layer 290 and the energy storage layer 220 each comprise a plurality of material layers aligned along the module plane HE (shown by hatching) with different material compositions from each other. One possible structure of each of the heating layer 290 and the energy storage layer 220 is shown in FIGS. 7 and 8.

The module 200 comprises a support element 260, for example a PET film, extending in a planar manner along the module plane HE, to which at least the layers of the module 200 are applied, for example by screen printing.

The module 200 comprises an encapsulation layer 270 for protecting the other layers of the module 200 from environmental influences, wherein, for example, the encapsulation layer 270 is translucent at least in sections. The encapsulation layer 270 consists, for example, of a transparent plastic, in particular PET.

For example, the order of the layers of the module 200 perpendicular to module plane HE is: support element 260, energy storage layer 220, insulation layer 240, heating layer 290, photovoltaic layer 280, luminescent layer 210, encapsulation layer 270.

FIG. 5 shows a schematic sectional view perpendicular to the module plane HE of a luminous layer 210, for example in the form of an OLED, of a module 200 of a paving slab 300 produced according to embodiments of the invention, comprising a plurality of material layers aligned along the module plane HE and having different material compositions from one another.

The illustrated luminescent layer 210 comprises, for example, an anode layer 211 consisting, for example, of indium tin oxide, and an adjoining hole-conducting layer 212. Adjacent to the hole-conducting layer 212 is a dye layer 213 containing an organic dye. The illustrated luminescent layer 210 is terminated by a cathode layer 214 comprising a metal, such as calcium or barium. The dye may comprise, for example, a derivative of poly(p-phenylene-vinyl).

Figure 6:
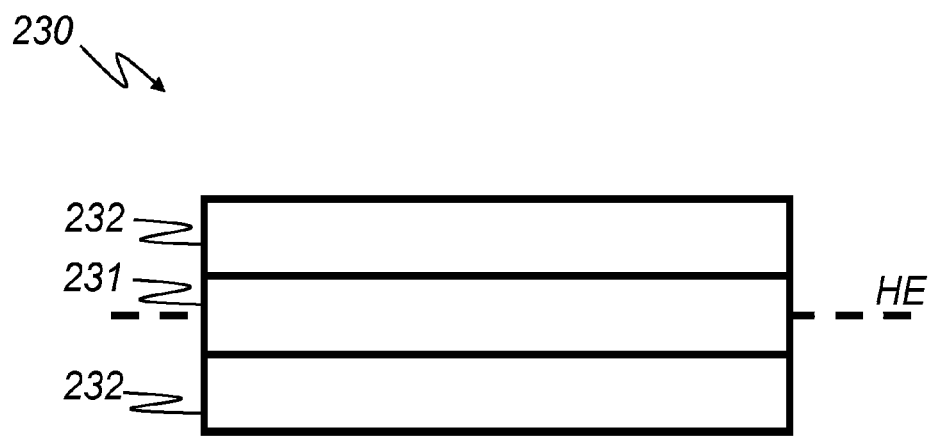
FIG. 6 shows a schematic sectional view perpendicular to the module plane of an induction layer of a module of a paving slab produced according to embodiments of the invention.

FIG. 6 shows a schematic sectional view perpendicular to the module plane HE of an induction layer 230 of a module 200 of a paving slab 300 produced according to embodiments of the invention, comprising several layers of material aligned along the module plane HE and having different material compositions from one another.

The illustrated induction layer 230 comprises, for example, an induction coil 231, for example made of a metal, and an electrically insulating sheath 232, for example made of a plastic, at least perpendicular to the module plane HE above and below the induction coil 231.

FIG. 7 shows a schematic sectional view perpendicular to the module plane HE of a heating layer 290 of a module 200 of a paving slab 300 produced according to embodiments of the invention, comprising several layers of material aligned along the module plane HE and having different material compositions from one another.

The illustrated heating layer 290 comprises, for example, a number of conductive tracks 291, for example made of a metal, and an electrically insulating layer 292, for example made of a plastic, perpendicular to the module plane HE above and below each of the conductive tracks 291.

FIG. 8 shows a schematic sectional view perpendicular to the module plane HE of an energy storage layer 220 of a module 200 of a paving slab 300 produced according to embodiments of the invention, comprising several layers of material aligned along the module plane HE and having different material compositions from one another.

The energy storage layer 220, which is designed as a solid-state accumulator, for example, comprises two electrode layers 222, a separator layer 221 with an electrolyte in between and an encapsulation layer 223, for example made of a plastic, designed as an electrical insulator on each of the outer sides.

The electrode layers 222 comprise, for example, carbon and/or an electrically conductive polymer. The encapsulation layers 223 comprise, for example, an electrically insulating plastic.

The separator layer 221 comprises, for example, an ion-conductive porous plastic polymer electrolyte.

FIG. 9 shows a schematic sectional view perpendicular to the module plane HE of a photovoltaic layer 280 of a module 200 of a paving slab 300 produced according to embodiments of the invention, comprising several layers of material aligned along the module plane HE and having different material compositions from one another.

For example, the photovoltaic layer 280 is configured as a thin film solar cell comprising, for example, microcrystalline silicon (μc-Si:H) as the photoactive material.

The photovoltaic layer 280 comprises, for example, perpendicular to the module plane HE, one above the other, a translucent front electrode layer 281 and then a photoactive layer 282 with the photoactive material and then a back electrode layer 283. The photovoltaic layer 280 is terminated perpendicular to the module plane HE, for example, by an electrically insulating encapsulation layer 223, for example made of a plastic.

Although the invention has been illustrated and described in greater detail with reference to the exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

| List of reference signs | |
|---|---|
| 200 | Module |
| 210 | Luminous layer |
| 211 | Anode layer |
| 212 | Hole-conducting layer |
| 213 | Dye layer |
| 214 | Cathode layer |
| 220 | Energy storage layer |
| 221 | Separator layer |
| 222 | Electrode layer |
| 223 | Encapsulation layer |
| 230 | Induction layer |
| 231 | Induction coil |
| 232 | Sheath |
| 240 | Insulating layer |
| 260 | Support element |
| 270 | Encapsulation layer |
| 280 | Photovoltaic layer |
| 281 | Front electrode layer |
| 282 | Photoactive layer |
| 283 | Back electrode layer |
| 290 | Heating layer |
| 291 | Conductive track |
| 292 | Insulating layer |
| 300 | Paving slab |
| 310 | Slab body |
| 311 | Recess |
| 320 | Cover element |
| HE | Module plane |

The invention claimed is:

1. A method for producing a paving slab for paving a traffic surface, the paving slab comprising:
   a. a slab body with at least one recess,
   b. a module arranged in the at least one recess, the module extending flatly along a module plane, and
   c. at least one flat cover element aligned along the module plane and translucent at least in sections for protecting the module,
   d. wherein the module is enclosed by the slab body and the at least one cover element in at least a liquid-tight manner,
   e. the module comprising:
   i. at least one flat photovoltaic layer aligned along the module plane for generating electrical energy,
   ii. at least one flat luminous layer aligned along the module plane for illuminating a surrounding area of the module, and
   iii. at least one flexible support element extending in a planar manner along the module plane, to which the at least one photovoltaic layer and the at least one luminous layer are applied by screen printing,
f. wherein the at least one photovoltaic layer and the at least one luminous layer each comprise a plurality of material layers aligned along the module plane and having different material compositions from each other,
g. wherein the at least one photovoltaic layer, the at least one luminous layer, the at least one flexible support element and the entire module are flexibly configured, the method comprising:
h. providing the at least one flexible support element for the module of the paving slab,
i. screen printing the at least one photovoltaic layer and the at least one luminous layer of the module onto the at least one flexible support element,
j. placing the module in the recess of the slab body of the paving slab and
k. liquid-tight enclosing of the module in the recess with the cover element of the paving slab,
l. wherein enclosing the module comprises casting the cover element made of a plastic onto the module in the recess under high-frequency excitation of the plastic.

2. The method according to claim 1, wherein
m. the module comprises at least one flat and flexible heating layer aligned along the module plane for heating an environment of the module,
n. wherein the at least one heating layer is applied to the at least one flexible support element by screen printing, and
o. wherein the at least one heating layer comprises a plurality of material layers aligned along the module plane with different material compositions from each other.

3. The method according to claim 2, wherein
p. the module comprises at least one flat and flexible energy storage layer aligned along the module plane for storing electrical energy,
q. wherein the at least one energy storage layer is applied to the at least one flexible support element by screen printing, and
r. wherein the at least one energy storage layer comprises a plurality of material layers aligned along the module plane with different material compositions from each other.

4. The method according to claim 3, wherein
s. a flat and flexible thermal insulation layer aligned along the module plane is arranged between the heating layer and the energy storage layer,
t. wherein the insulating layer is applied to the at least one flexible support element by screen printing.

5. The method according to claim 4, wherein the insulating layer of the module comprises a calcium silicate, chitosan, and a heat resistant binder.

6. The method according to claim 1, wherein the at least one photovoltaic layer and the at least one luminous layer of the module are arranged side by side or within each other along the module plane of the module.

7. The method according to claim 1, wherein
u. the module comprises at least one flexible encapsulation layer for protecting the at least one luminous layer and the at least one photovoltaic layer from environmental influences,
v. wherein the at least one flexible support element and/or the encapsulation layer is translucent at least in sections.

8. The method according to claim 1, wherein
w. the paving slab comprises at least one sensor for automatically controlling the at least one luminous layer of the module,
x. wherein the at least one sensor comprises a presence sensor selected from a radar sensor and an infrared sensor.

9. The method according to claim 1, wherein at least one layer of the module is cured by irradiating the layer with infrared light.

10. A method for producing a paving slab for paving a traffic surface, the paving slab having a slab body with at least one recess, a module arranged in the at least one recess, the module extending flatly along a module plane, and at least one flat cover element aligned along the module plane and translucent at least in sections for protecting the module,
wherein the module is enclosed by the slab body and the at least one cover element in at least a liquid-tight manner, the module comprising: at least one flat photovoltaic layer aligned along the module plane for generating electrical energy, at least one flat luminous layer aligned along the module plane for illuminating a surrounding area of the module, a heating layer aligned along the module plane, an energy storage layer aligned along the module plane, a thermal insulation layer aligned along module plane between the heating layer and the energy storage layer, and a flexible support element extending in a planar manner along the module plane, to which the at least one photovoltaic layer and the at least one luminous layer are applied by screen printing,
wherein the at least one photovoltaic layer and the at least one luminous layer each comprise a plurality of material layers aligned along the module plane and having different material compositions from each other,
wherein the at least one photovoltaic layer, the at least one luminous layer, the flexible support element and the entire module are flexibly configured, the method comprising:
providing the support element for the module of the paving slab,
screen printing the at least one photovoltaic layer, the at least one luminous layer, the heating layer, the energy storage layer, and/or the insulating layer of the module,
placing the module in the recess of the slab body of the paving slab, and
liquid-tight enclosing of the module in the recess with the cover element of the paving slab,
wherein enclosing the module comprises casting the cover element made of a plastic onto the module in the recess under high-frequency excitation of the plastic.

11. The method according to claim 10, wherein the insulating layer comprises a calcium silicate, chitosan, and a heat resistant binder.

12. The method according to claim 10, wherein at least one layer of the module is cured by irradiating the layer with infrared light.

* * * * *